US009634299B2

United States Patent
Kim

(10) Patent No.: US 9,634,299 B2
(45) Date of Patent: Apr. 25, 2017

(54) RECHARGEABLE BATTERY

(75) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/396,463

(22) Filed: Feb. 14, 2012

(65) Prior Publication Data

US 2013/0059170 A1    Mar. 7, 2013

Related U.S. Application Data

(60) Provisional application No. 61/531,499, filed on Sep. 6, 2011.

(51) Int. Cl.
*H01M 2/00* (2006.01)
*H01M 2/04* (2006.01)
(Continued)

(52) U.S. Cl.
CPC .......... *H01M 2/043* (2013.01); *H01M 2/305* (2013.01); *H01M 2/345* (2013.01); *H01M 2/22* (2013.01);
(Continued)

(58) Field of Classification Search
CPC .. H01M 2200/20; H01M 2/305; H01M 2/345; H01M 2/043; H01M 2/02;
(Continued)

(56) References Cited

U.S. PATENT DOCUMENTS 4,209,571 A    6/1980  Bessett et al.
4,945,014 A    7/1990  Miyabayashi et al.
(Continued)

FOREIGN PATENT DOCUMENTS

CN    1395328 A    2/2003
CN    1481039 A    3/2004
(Continued)

OTHER PUBLICATIONS

European Search Report dated Dec. 20, 2012, for corresponding European Patent application 12178835.0, (6 pages).
(Continued)

*Primary Examiner* — Jonathan Jelsma
*Assistant Examiner* — Omar Kekia
(74) *Attorney, Agent, or Firm* — Lewis Roca Rothgerber Christie LLP

(57) ABSTRACT

A rechargeable battery includes: an electrode assembly including a first electrode having a first polarity and a second electrode having a second polarity, the second polarity being different from the first polarity; a case housing the electrode assembly; a first terminal electrically connected to the first electrode; a cap plate coupled to an opening of the case; a first lower insulating member between the first electrode and the cap plate; and a first short-circuit member between the first terminal and the first lower insulating member, and configured to be deformed to electrically connect the first electrode to the cap plate, wherein the first terminal includes a first fixing portion electrically connected to the first electrode.

17 Claims, 10 Drawing Sheets

(51) Int. Cl.
*H01M 2/22* (2006.01)
*H01M 2/30* (2006.01)
*H01M 2/34* (2006.01)

(52) U.S. Cl.
CPC ............. *H01M 2/30* (2013.01); *H01M 2/347* (2013.01); *H01M 2200/20* (2013.01)

(58) Field of Classification Search
CPC ............ H01M 2/04; H01M 2/22; H01M 2/30; H01M 2/347
USPC .. 429/53, 54, 56, 58, 61, 65, 161, 163, 178, 429/179, 185, 211
See application file for complete search history.

(56) References Cited

U.S. PATENT DOCUMENTS

| | | | |
|---|---|---|---|
| 5,143,860 | A | 9/1992 | Mitchell et al. |
| 5,523,178 | A * | 6/1996 | Murakami et al. ............. 429/53 |
| 5,707,756 | A | 1/1998 | Inoue et al. |
| 5,766,793 | A | 6/1998 | Kameishi et al. |
| 5,800,937 | A | 9/1998 | Decker et al. |
| 6,005,469 | A | 12/1999 | Kalapodis et al. |
| 6,083,792 | A | 7/2000 | Sung |
| 6,143,440 | A | 11/2000 | Volz et al. |
| 6,342,826 | B1 | 1/2002 | Quinn et al. |
| 6,399,237 | B1 | 6/2002 | Souliac et al. |
| 6,403,250 | B1 | 6/2002 | Azema et al. |
| 6,509,115 | B2 * | 1/2003 | Kim et al. ..................... 429/175 |
| 6,525,371 | B2 | 2/2003 | Johnson et al. |
| 6,562,493 | B2 | 5/2003 | Tsukada et al. |
| 6,642,110 | B2 | 11/2003 | Jung et al. |
| 6,753,104 | B2 | 6/2004 | Kitoh |
| 6,899,972 | B2 | 5/2005 | Cho |
| 7,351,496 | B2 | 4/2008 | Nakanishi et al. |
| 7,601,455 | B2 | 10/2009 | Yoon |
| 7,666,544 | B2 | 2/2010 | Barrault et al. |
| 8,043,737 | B2 | 10/2011 | Kim |
| 8,415,052 | B2 | 4/2013 | Yoshida et al. |
| 2002/0052080 | A1 | 5/2002 | Lee |
| 2002/0142543 | A1 | 10/2002 | Lin et al. |
| 2003/0013005 | A1 | 1/2003 | Chang |
| 2003/0027036 | A1 | 2/2003 | Emori et al. |
| 2003/0027044 | A1 | 2/2003 | Asahina et al. |
| 2003/0151868 | A1 | 8/2003 | Inae et al. |
| 2004/0092167 | A1 | 5/2004 | Barrault et al. |
| 2004/0126650 | A1 | 7/2004 | Kim |
| 2004/0170887 | A1 | 9/2004 | Masumoto et al. |
| 2004/0234842 | A1 | 11/2004 | Kawano et al. |
| 2005/0112455 | A1 | 5/2005 | Marubayashi et al. |
| 2005/0112456 | A1 | 5/2005 | Kozu et al. |
| 2005/0124133 | A1 | 6/2005 | Tu |
| 2005/0269622 | A1 | 12/2005 | Klinger et al. |
| 2006/0099500 | A1 * | 5/2006 | Jeon ................. 429/174 |
| 2007/0077706 | A1 | 4/2007 | Orlowski et al. |
| 2007/0122691 | A1 | 5/2007 | Lee et al. |
| 2007/0166605 | A1 | 7/2007 | Meguro et al. |
| 2007/0182020 | A1 | 8/2007 | Trezza et al. |
| 2007/0212595 | A1 | 9/2007 | Kim et al. |
| 2007/0269711 | A1 | 11/2007 | Meguro et al. |
| 2008/0070067 | A1 | 3/2008 | Jang et al. |
| 2008/0145748 | A1 | 6/2008 | Jung |
| 2008/0213657 | A1 | 9/2008 | Qi et al. |
| 2009/0087733 | A1 * | 4/2009 | Yoon et al. ................. 429/178 |
| 2009/0305126 | A1 | 12/2009 | Choi et al. |
| 2010/0028762 | A1 | 2/2010 | Yokoyama et al. |
| 2010/0081048 | A1 | 4/2010 | Nansaka et al. |
| 2010/0136388 | A1 | 6/2010 | Kim et al. |
| 2010/0167107 | A1 | 7/2010 | Byun et al. |
| 2010/0227205 | A1 | 9/2010 | Byun et al. |
| 2010/0279156 | A1 * | 11/2010 | Kim et al. ..................... 429/56 |
| 2010/0291421 | A1 | 11/2010 | Byun et al. |
| 2011/0039136 | A1 | 2/2011 | Byun et al. |
| 2011/0052949 | A1 * | 3/2011 | Byun et al. ..................... 429/61 |
| 2011/0104520 | A1 | 5/2011 | Ahn |
| 2011/0135976 | A1 | 6/2011 | Byun |
| 2011/0136004 | A1 | 6/2011 | Kwak et al. |
| 2011/0177387 | A1 | 7/2011 | Byun et al. |
| 2011/0183193 | A1 | 7/2011 | Byun et al. |
| 2011/0244280 | A1 | 10/2011 | Byun et al. |

FOREIGN PATENT DOCUMENTS

| | | |
|---|---|---|
| CN | 100438189 C | 11/2008 |
| CN | 101997133 A | 3/2011 |
| CN | 102005597 A | 4/2011 |
| EP | 0 313 405 A1 | 4/1989 |
| EP | 1 076 350 A2 | 2/2001 |
| EP | 1 717 886 A2 | 11/2006 |
| EP | 1 901 369 A1 | 3/2008 |
| EP | 2 284 932 A1 | 2/2011 |
| EP | 2 287 942 A1 | 2/2011 |
| EP | 2 299 512 A1 | 3/2011 |
| EP | 2 333 871 A1 | 6/2011 |
| EP | 2 348 558 A1 | 7/2011 |
| EP | 2 357 685 A1 | 8/2011 |
| JP | 05-062664 | 3/1993 |
| JP | 05-251290 | 9/1993 |
| JP | 05-275088 | 10/1993 |
| JP | 06-290767 | 10/1994 |
| JP | 07-037572 | 2/1995 |
| JP | 07-201372 | 8/1995 |
| JP | 08-050920 | 2/1996 |
| JP | 08-185850 | 7/1996 |
| JP | 09-106804 | 4/1997 |
| JP | 10-074500 | 3/1998 |
| JP | 10-188946 | 7/1998 |
| JP | 10-208725 | 8/1998 |
| JP | 10-326610 | 12/1998 |
| JP | 11-007931 | 1/1999 |
| JP | 11-040203 | 2/1999 |
| JP | 11-273651 | 10/1999 |
| JP | 11-307076 | 11/1999 |
| JP | 2000-082457 | 3/2000 |
| JP | 2000-182598 | 6/2000 |
| JP | 2000-235872 | 8/2000 |
| JP | 2001-202946 | 7/2001 |
| JP | 2001-357834 | 12/2001 |
| JP | 2002-216743 | 8/2002 |
| JP | 2003-051303 | 2/2003 |
| JP | 2003-051304 | 2/2003 |
| JP | 2003-092103 | 3/2003 |
| JP | 2003-178745 | 6/2003 |
| JP | 2003-197178 | 7/2003 |
| JP | 2003-223886 | 8/2003 |
| JP | 2003-308815 | 10/2003 |
| JP | 2004-022477 | 1/2004 |
| JP | 2004-087194 | 3/2004 |
| JP | 2004-521459 | 7/2004 |
| JP | 2004-273139 | 9/2004 |
| JP | 2004-319463 | 11/2004 |
| JP | 2005-032477 | 2/2005 |
| JP | 2005-044626 | 2/2005 |
| JP | 2005-166584 | 6/2005 |
| JP | 2006-012602 | 1/2006 |
| JP | 2006-93136 | 4/2006 |
| JP | 2006-147180 | 6/2006 |
| JP | 2007-141518 A | 6/2007 |
| JP | 2008-27668 | 2/2008 |
| JP | 2008-159313 A | 7/2008 |
| JP | 2008-177084 | 7/2008 |
| JP | 2008-186591 | 8/2008 |
| JP | 2008-218132 | 9/2008 |
| JP | 2009-105075 | 5/2009 |
| JP | 2010-033777 | 2/2010 |
| JP | 2010-097822 | 4/2010 |
| JP | 2011-018645 | 1/2011 |
| JP | 2011-40391 | 2/2011 |
| JP | 2011-54561 | 3/2011 |
| JP | 2011-96664 | 5/2011 |
| JP | 2011-124214 | 6/2011 |
| JP | 2011-154991 | 8/2011 |
| JP | 2011-210717 | 10/2011 |
| KR | 20-1999-0031054 U | 7/1999 |

(56) References Cited

FOREIGN PATENT DOCUMENTS

| KR | 10-2001-0011900 | | 2/2001 |
|---|---|---|---|
| KR | 10-2001-0021236 | | 3/2001 |
| KR | 2002-0021887 | | 3/2002 |
| KR | 10-2004-0074487 | | 8/2004 |
| KR | 10-2006-0020211 | | 3/2006 |
| KR | 10-2006-0039955 | | 5/2006 |
| KR | 10-0693115 | B1 | 3/2007 |
| KR | 10-2007-0122471 | | 12/2007 |
| KR | 10-0870349 | B1 | 11/2008 |
| KR | 10-2009-0097599 | | 9/2009 |
| KR | 10-2010-0036164 | | 4/2010 |
| KR | 10-2010-0052885 | | 5/2010 |
| KR | 10-2010-0062886 | | 6/2010 |
| KR | 10-2010-0076699 | | 7/2010 |
| KR | 10-2010-0088021 | | 8/2010 |
| KR | 10-2010-0099983 | | 9/2010 |
| KR | 10-2010-0123598 | | 11/2010 |
| KR | 10-2011-0005197 | | 1/2011 |
| KR | 10-2011-0017820 | | 2/2011 |
| KR | 10-2011-0025056 | | 3/2011 |
| KR | 10-2011-0030043 | | 3/2011 |
| KR | 10-1042808 | B1 | 6/2011 |
| KR | 10-2011-0136166 | | 12/2011 |
| WO | WO 02/071510 | A1 | 9/2002 |
| WO | WO 2007/126243 | A1 | 11/2007 |

OTHER PUBLICATIONS

KIPO Office action dated Jan. 17, 2012 for Korean Patent application 10-2010-0068019, (9 pages).
KIPO Office action dated Mar. 19, 2012 for Korean Patent application 10-2010-0062270, (5 pages).
KIPO Office action dated Jun. 18, 2012 for Korean Patent application 10-2011-0003951, (4 pages).
KIPO Office action dated Aug. 13, 2012 for Korean Patent application 10-2011-0036267, (4 pages).
KIPO Office action dated Oct. 8, 2012, for Korean Patent application 10-2011-0050510, (4 pages).
KIPO Office action dated Apr. 4, 2012, for Korean Patent application 10-2010-0062874, (5 pages).
KIPO Notice of Allowance dated Oct. 26, 2012, for Korean Patent application 10-2010-0052011, (5 pages).
KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
KIPO Letters Patent dated Dec. 15, 2011, for Korean Patent application 10-2009-0116065, (11 pages).
EPO Search Report dated Aug. 16, 2010 for European Patent application 101685263.1, (6 pages).
EPO Search Report dated Aug. 19, 2010 for European Patent application 10164550.5, (8 pages).
EPO Search Report dated Aug. 19, 2010 for European Patent application 10167890.2, (7 pages).
EPO Search Report dated Oct. 13, 2010 for European Patent application 10169791, (6 pages).
EPO Search Report dated Dec. 14, 2012 for European Patent application 12160354.2, (5 pages).
EPO Search Report dated Sep. 29, 2011 for European Patent application 11169286.9, (5 pages).
EPO Search Report dated Feb. 29, 2012 for European Patent application 11165265.7, (5 pages).
EPO Search Report dated Sep. 28, 2012 for European Patent application 12179697.3, (6 pages).
EPO Search Report dated Oct. 2, 2012 for European Patent application 11178263.7, (7 pages).
EPO Office action dated Feb. 8, 2011 for European Patent application 10168526.1, (4 pages).
EPO Office action dated Mar. 7, 2011 for European Patent application 10164550.5, (5 pages).
EPO Office action dated Apr. 21, 2011 for European Patent application 10169791, (6 pages).
EPO Office action dated Jul. 19, 2011 for European Patent application 10170406.2 (3 pages).
EPO Office action dated Apr. 20, 2011 for European Patent application 10167890.2, (6 pages).
EPO Office action dated Aug. 17, 2011 for European Patent application 10164550.5, (8 pages).
EPO Office action dated Mar. 22, 2012 for European Patent application 101164550.5 (4 pages).
EPO Office action dated Jul. 27, 2012 for European Patent application 10164550.5 (5 pages).
JPO Office action dated Aug. 28, 2012, for Japanese Patent application 2010-170281, (2 pages).
JPO Office action dated Feb. 5, 2013, for Japanese Patent application 2010-154142, (2 pages).
JPO Office action dated Apr. 30, 2013, for Japanese Patent application 2011-115662, (2 pages).
JPO Office action dated Jun. 4, 2013, for Japanese Patent application 2011-170959, (3 pages).
JPO Office action dated Sep. 24, 2013, for Japanese Patent application 2011-170959, (3 pages).
SIPO Office action dated Jan. 22, 2013, with English translation for Chinese Patent application 201010220632.0, (20 pages).
SIPO Office action dated Apr. 12, 2013, with English translation, for Chinese Patent application 201010135715.X, (20 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
SIPO Office action dated Dec. 4, 2013, with English translation for Chinese Patent application 201110207662.2, (20 pages).
SIPO Office action dated Aug. 27, 2012, with English translation, for Chinese Patent application 201010135715.X, (16 pages).
SIPO Office action dated May 19, 2014, with English translation, for Chinese Patent application 201110207662.2, (16 pages).
Korean Patent Abstracts for Korean Publication 10-2008-0084416 dated Sep. 19, 2008, corresponding to Korean Patent 10-0870349 dated Nov. 25, 2008, listed above.
U.S. Notice of Allowance dated Sep. 23, 2013, for cross reference U.S. Appl. No. 13/210,124, (15 pages).
U.S. Notice of Allowance dated Jan. 29, 2014, for cross reference U.S. Appl. No. 12/781,656, (7 pages).
U.S. Notice of Allowance dated Mar. 20, 2014, for cross reference U.S. Appl. No. 12/781,656, (14 pages).
U.S. Notice of Allowance dated Apr. 30, 2014, for cross reference U.S. Appl. No. 13/563,028, (27 pages).
U.S. Notice of Allowance dated Apr. 13, 2012, for cross reference U.S. Appl. No. 12/634,000, (10 pages).
U.S. Notice of Allowance dated Jun. 27, 2014, for cross reference U.S. Appl. No. 12/781,656, (7 pages).
U.S. Office action dated Jun. 4, 2014, for cross reference U.S. Appl. No. 13/077,640, (25 pages).
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
U.S. Office action dated May 6, 2013, for cross reference U.S. Appl. No. 13/077,640, (17 pages).
U.S. Office action dated Aug. 17, 2010, for cross reference U.S. Appl. No. 12/626,582, (11 pages).
U.S. Office action dated Nov. 23, 2010, for cross reference U.S. Appl. No. 12/626,582, (10 pages).
U.S. Office action dated Feb. 1, 2013, for cross reference U.S. Appl. No. 12/781,656, (17 pages).
U.S. Office action dated Jul. 3, 2013, for cross reference U.S. Appl. No. 12/781,656, (15 pages).
U.S. Office action dated Oct. 8, 2013, for cross reference U.S. Appl. No. 13/563,028, (16 pages).
U.S. Office action dated Nov. 21, 2013, for cross reference U.S. Appl. No. 13/077,640, (16 pages).
U.S. Office action dated Nov. 14, 2013, for cross reference U.S. Appl. No. 12/781,656, (20 pages).

(56) References Cited

OTHER PUBLICATIONS

U.S. Office action dated May 20, 2014, for cross reference U.S. Appl. No. 12/626,582, (26 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
Patent Abstracts of Japan, and English machine translation of Japanese Publication 05-062664, dated Mar. 12, 1993, (11 pages).
Patent Abstracts of Japan, and English machine translation of Japanese Publication 05-251290, dated Sep. 28, 1993, (5 pages).
Patent Abstracts of Japan, and English machine translation of Japanese Publication 05-275088, dated Oct. 22, 1993, (6 pages).
Patent Abstracts of Japan, and English machine translation of Japanese Publication 06-290767, dated Oct. 18, 1994, (13 pages).
Patent Abstracts of Japan, and English machine translation of Japanese Publication 07-037572, dated Feb. 7, 1995, (5 pages).
Patent Abstracts of Japan, and English machine translation of Japanese Publication 07-201372, dated Aug. 4, 1995, (5 pages).
Patent Abstracts of Japan, and English machine translation of Japanese Publication 08-050920, dated Feb. 20, 1996, (14 pages).
Patent Abstracts of Japan, and English machine translation of Japanese Publication 08-185850, dated Jul. 16, 1996, (11 pages), also Corresponds to U.S. Pat. No. 6,753,104 listed above.
Patent Abstracts of Japan, and English machine translation of Japanese Publication 10-188946, dated Jul. 21, 1998, (8 pages), also Corresponds to U.S. Pat. No. 7,666,544 listed above.
Patent Abstracts of Japan, and English machine translation of Japanese Publication 10-208725, Aug. 7, 1998, (10 pages).
Patent Abstracts of Japan, and English machine translation of Japanese Publication 10-326610, dated Dec. 8, 1998 (10 pages).
Patent Abstracts of Japan, and English machine translation of Japanese Publication 11-040203, Feb. 12, 1999, (12 pages).
Patent Abstracts of Japan, and English machine translation of Japanese Publication 11-273651, Oct. 8, 1999, (12 pages).
Patent Abstracts of Japan, and English machine translation of Japanese Publication 11-307076, dated Nov. 5, 1999, (6 pages).
Patent Abstracts of Japan, and English machine translation of Japanese Publication 2000-082457, Mar. 21, 2000, (13 pages).
Patent Abstracts of Japan, and English machine translation of Japanese Publication 2000-182598, dated Jun. 30, 2000, (21 pages).
Patent Abstracts of Japan, and English machine translation of Japanese Publication 2001-202946, dated Jul. 27, 2001, (8 pages).
Patent Abstracts of Japan, and English machine translation of Japanese Publication 2001-357834, dated Dec. 26, 2001, (15 pages).
Patent Abstracts of Japan, and English machine translation of Japanese Publication 2002-216743, dated Aug. 2, 2002, (10 pages).
Patent Abstracts of Japan, and English machine translation of Japanese Publication 2003-051304, dated Feb. 21, 2003, (19 pages).
Patent Abstracts of Japan, and English machine translation of Japanese Publication 2003-092103, dated Mar. 28, 2003, (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated Aug. 8, 2003, (10 pages).
Patent Abstracts of Japan, and English machine translation of Japanese Publication 2004-022477, Jan. 22, 2004, (7 pages).
Patent Abstracts of Japan, and English machine translation of Japanese Publication 2004-087194, Mar. 18, 2004, (10 pages).
Patent Abstracts of Japan, and English machine translation of Japanese Publication 2004-273139, Sep. 30, 2004, (24 pages).
Patent Abstracts of Japan, and English machine translation of Japanese Publication 2004-319463, Nov. 11, 2004, (13 pages).
Patent Abstracts of Japan, and English machine translation of Japanese Publication 2005-032477, dated, Feb. 3, 2005, (11 pages).
Patent Abstracts of Japan, and English machine translation of Japanese Publication 2005-044626, dated Feb. 17, 2005, (21 pages).
Patent Abstracts of Japan, and English machine translation of Japanese Publication 2006-012602, dated Jan. 12, 2006, (10 pages).
Patent Abstracts of Japan, and English machine translation of Japanese Publication 2008-027668, dated Feb. 7, 2008, (13 pages).
Patent Abstracts of Japan, and English machine translation of Japanese Publication 2008-177084, dated Jul. 31, 2008, (11 pages).
Patent Abstracts of Japan, and English machine translation of Japanese Publication 2008-186591, Aug. 14, 2008, (14 pages).
Patent Abstracts of Japan, and English machine translation of Japanese Publication 2008-218132, Sep. 18, 2008, (10 pages).
Patent Abstracts of Japan, and English machine translation of Japanese Publication 2009-105075, dated May 14, 2009, (10 pages).
Patent Abstracts of Japan, and English machine translation of Japanese Publication 2010-033777, Feb. 12, 2010, (16 pages).
Patent Abstracts of Japan, and English machine translation of Japanese Publication 2010-097822, dated Apr. 30, 2010, (24 pages).
Patent Abstracts of Japan, and English machine translation of Japanese Publication 2011-018645, dated Jan. 27, 2011, (15 pages).
U.S. Notice of Allowance dated Feb. 5, 2015, for cross reference U.S. Appl. No. 13/563,028, (8 pages).
EPO Office action dated Aug. 14, 2015 for European Patent application 12178835.0, (5 pages).
SIPO Office action dated Jul. 6, 2015 for Chinese Patent application 201010135715.X, (10 pages).
U.S. Office action dated Jun. 8, 2015, for cross reference U.S. Appl. No. 12/626,582 (10 pages).
U.S. Advisory Action dated Dec. 9, 2015, for cross reference U.S. Appl. No. 13/077,640, (6 pages).
KIPO Notice of Allowance dated Mar. 11, 2016, corresponding to Korean Patent application 10-2011-0105428, (5 pages).
KIPO Office action dated Mar. 19, 2016, corresponding to Korean Patent application 10-2011-0120472, (6 pages).
U.S. Office action dated Mar. 3, 2016, for cross reference U.S. Appl. No. 13/077,640, (18 pages).
English machine translation of Japanese Publication 2000-235872 dated Aug. 29, 2000, listed above, (9 pages).
SIPO Office action dated Oct. 10, 2015, with English translation, corresponding to Chinese Patent application 201210308716.9, (10 pages).
U.S. Notice of Allowance dated Sep. 18, 2015, for cross reference U.S. Appl. No. 12/626,582, (10 pages).
U.S. Office action dated Sep. 25, 2015, for cross reference U.S. Appl. No. 13/077,640, (18 pages).
JPO Office action dated May 31, 2016, for corresponding Japanese Patent application 2012-189026, (9 pages).
U.S. Notice of Allowance dated Jun. 23, 2016, for cross reference U.S. Appl. No. 13/077,640, (16 pages).
SIPO Office Action dated Jun. 27, 2016, with English translation, for corresponding Chinese Patent Application No. 201210308716.9 (12 pages).
KIPO Notice of Allowance dated Sep. 26, 2016, for corresponding Korean Patent Application No. 10-2011-0120472 (5 pages).
KIPO Office action dated Nov. 20, 2012 corresponding to Korean Patent application 10-2011-0073880, (8 pages).
SIPO Office action dated Oct. 8, 2014, with English translation, for corresponding Chinese Patent application 201110207662.2, (18 pages).
SIPO Office action dated Dec. 22, 2014, with English translation, for corresponding Chinese Patent application 201010135715.X, (15 pages).
U.S. Notice of Allowability dated Aug. 19, 2014, for cross reference U.S. Appl. No. 12/781,656, (2 pages).
U.S. Notice of Allowance dated Aug. 28, 2014, for cross reference U.S. Appl. No. 13/563,028, (9 pages).
U.S. Notice of Allowance dated Dec. 4, 2014, for cross reference U.S. Appl. No. 13/563,028, (9 pages).
U.S. Notice of Allowance dated Dec. 19, 2014, for cross reference U.S. Appl. No. 13/333,869, (21 pages).
U.S. Office action dated Oct. 16, 2014, for cross reference U.S. Appl. No. 12/626,582, (18 pages).

(56) References Cited

OTHER PUBLICATIONS

U.S. Office action dated Nov. 24, 2014, for cross reference U.S. Appl. No. 13/077,640, (18 pages).
U.S. Office action dated Mar. 25, 2015, for cross reference U.S. Appl. No. 13/077,640, (18 pages).
SIPO Office action dated Mar. 25, 2015, with English translation, for Chinese Patent application 201010135715.X, (14 pages).
SIPO Office action dated Mar. 26, 2015, with English translation, for Chinese Patent application 201110207662.2, (6 pages).
SIPO Office Action, with English translation of relevant parts, dated Jan. 16, 2017, for corresponding Chinese Patent Application No. 201210308716.9 (7 pages).
KIPO Patent Publication No. 10-1702979 dated Feb. 6, 2017, for corresponding Korean Patent Application No. 10-2012-0042162 (19 pages).

* cited by examiner

RECHARGEABLE BATTERY

CROSS-REFERENCE TO RELATED PATENT APPLICATION

This application claims priority to and the benefit of U.S. Provisional Patent Application No. 61/531,499 filed on Sep. 6, 2011, in the United States Patent and Trademark Office, the disclosure of which is incorporated herein in its entirety by reference.

BACKGROUND

1. Field

The described technology relates generally to a rechargeable battery. More particularly, the described technology relates generally to a rechargeable battery having an improved terminal structure.

2. Description of Related Art

A rechargeable battery can be recharged and discharged, unlike a primary battery that cannot be recharged. A rechargeable battery with low capacity is often used for a small portable electronic device such as a mobile phone, a laptop computer, and a camcorder, while a rechargeable battery with large capacity is typically used as a power source for driving a motor such as for a hybrid electric vehicle.

Recently, a large capacity high power rechargeable battery has been developed using a non-aqueous electrolyte having high energy density. The aforementioned rechargeable battery with large capacity is formed into a battery module with large capacity by coupling a plurality of these rechargeable batteries in series or in parallel in order to use them to drive a device, for example, a motor in an electric or hybrid electric vehicle requiring a large amount of electric power.

A large capacity rechargeable battery is typically composed of a plurality of rechargeable batteries that are connected in series, and the rechargeable battery may be fabricated to have a cylindrical shape, a prismatic shape, and the like.

If pressure rises due to an abnormal reaction within the rechargeable battery having a case made of metal or the like, such a rechargeable battery may explode or ignite.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having improved safety.

An aspect of an embodiment of the described teaching is directed toward an effort to improve the safety of, e.g., an electric or hybrid electric vehicle containing a rechargeable battery.

According to one embodiment of the present invention, a rechargeable battery includes: an electrode assembly including a first electrode having a first polarity and a second electrode having a second polarity, the second polarity being different from the first polarity; a case housing the electrode assembly; a first terminal electrically connected to the first electrode; a cap plate coupled to an opening of the case; a first lower insulating member between the first electrode and the cap plate; and a first short-circuit member between the first terminal and the first lower insulating member, and configured to be deformed to electrically connect the first electrode to the cap plate, wherein the first terminal includes a first fixing portion electrically connected to the first electrode.

The first short-circuit member may be electrically connected to the cap plate.

The cap plate may be electrically connected to the second electrode.

The first terminal may further include a first short-circuit tab protruding through the cap plate.

The first short-circuit member may include a peripheral portion and a curved portion, the curved portion curving toward the electrode assembly when a pressure inside the case is less than a deformation pressure of the first short-circuit member and curving toward the first short-circuit tab when the pressure inside the case is greater the deformation pressure.

The rechargeable battery may further include a first upper insulating member between the first terminal and the cap plate.

The first upper insulating member may include: a plate portion, the plate portion having a hole; and a first insulating protrusion extending from an edge of the hole through a short-circuit hole in the cap plate, wherein the first short circuit tab extends through the hole.

The insulating protrusion may include two arc portions spaced apart from one another, and the upper insulating member may further have two buffer holes, each of the buffer holes being located between a corresponding one of the arc portions and the plate portion.

The upper insulating member may further include a support portion extending across the hole, the arc portions being coupled to the support portion.

The upper insulating member may further include a sidewall extending from side edges of the plate portion and enclosing side edges of the first terminal.

The upper insulating member may further include a second insulating protrusion extending through a hole in the cap plate, the second insulating protrusion having a hole, and the first fixing portion may extend through the hole of the second insulating protrusion.

The first terminal may further include a first connecting terminal electrically connected to the first electrode, the first connecting terminal including a first terminal column protruding away from the electrode assembly, and the first short-circuit tab may include a first short-circuit protrusion protruding from the first connecting terminal toward the electrode assembly.

The rechargeable battery of claim 1 may further include a first support plate between the cap plate and the electrode assembly.

The first fixing portion may be riveted or welded to the first support plate.

The rechargeable battery may further include a first current collecting member electrically connected between the first electrode and the first terminal, wherein the first fixing portion extends through the first current collecting member and is riveted or welded to the first current collecting member.

Each of the first current collecting member, the first support plate, and the lower insulating member may have a hole, wherein the hole of the first current collecting member is aligned with the holes of the first support plate and the lower insulating member.

The first terminal may further include a second fixing portion protruding through the cap plate, the second fixing portion being spaced apart from the first fixing portion, the short-circuit member being located between the first fixing portion and the second fixing portion.

The rechargeable battery may further include: a second terminal electrically connected to the second electrode; and a second lower insulating member between the second electrode and the cap plate, wherein the second terminal includes a second fixing portion electrically connected to the second electrode.

The rechargeable battery may further include: a second short-circuit member configured to be deformed to electrically connect the cap plate to the second electrode; and a second upper insulating member between the second terminal and the cap plate, wherein the second terminal further includes a second short-circuit tab protruding through the cap plate.

The second terminal may further include a second connecting terminal electrically connected to the second electrode, the second connecting terminal including a second terminal column protruding away from the electrode assembly and the second short-circuit tab may include a second short-circuit protrusion protruding from the second connecting terminal toward the electrode assembly.

According to an embodiment of the present invention, because a short-circuit protrusion is formed at the bottom of each of the terminals, the positive electrode and the negative electrode can be easily short-circuited at a pressure (e.g., a set or predetermined pressure) without installing a separate member.

Moreover, the shape of the lower insulating member can be stably maintained since the fixing portions are formed on each of the terminals.

DETAILED DESCRIPTION

Figure 1:
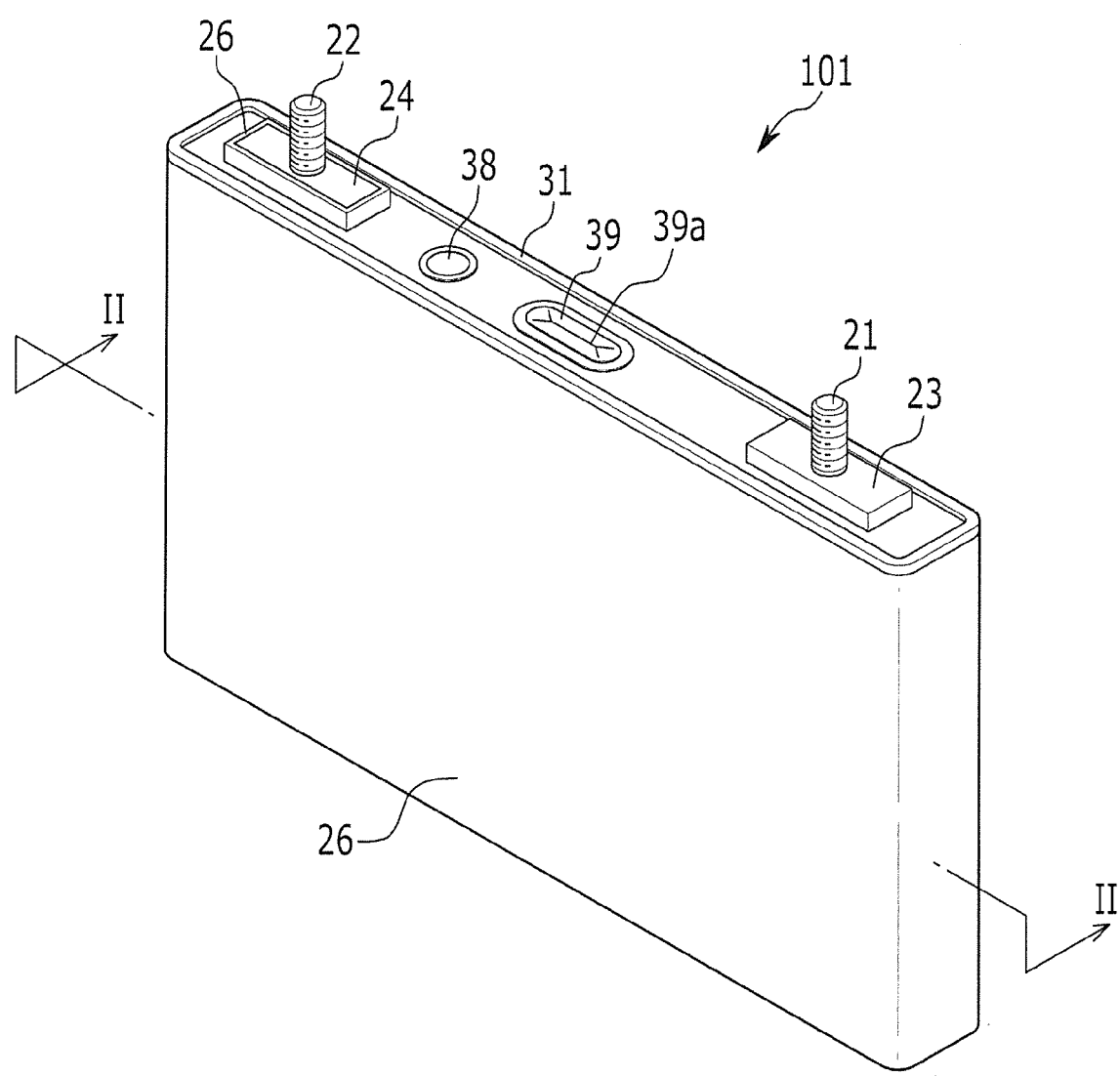
FIG. 1 is a perspective view illustrating a rechargeable battery according to a first embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention. In the specification and drawings, like reference numerals designate like elements.

Figure 2:
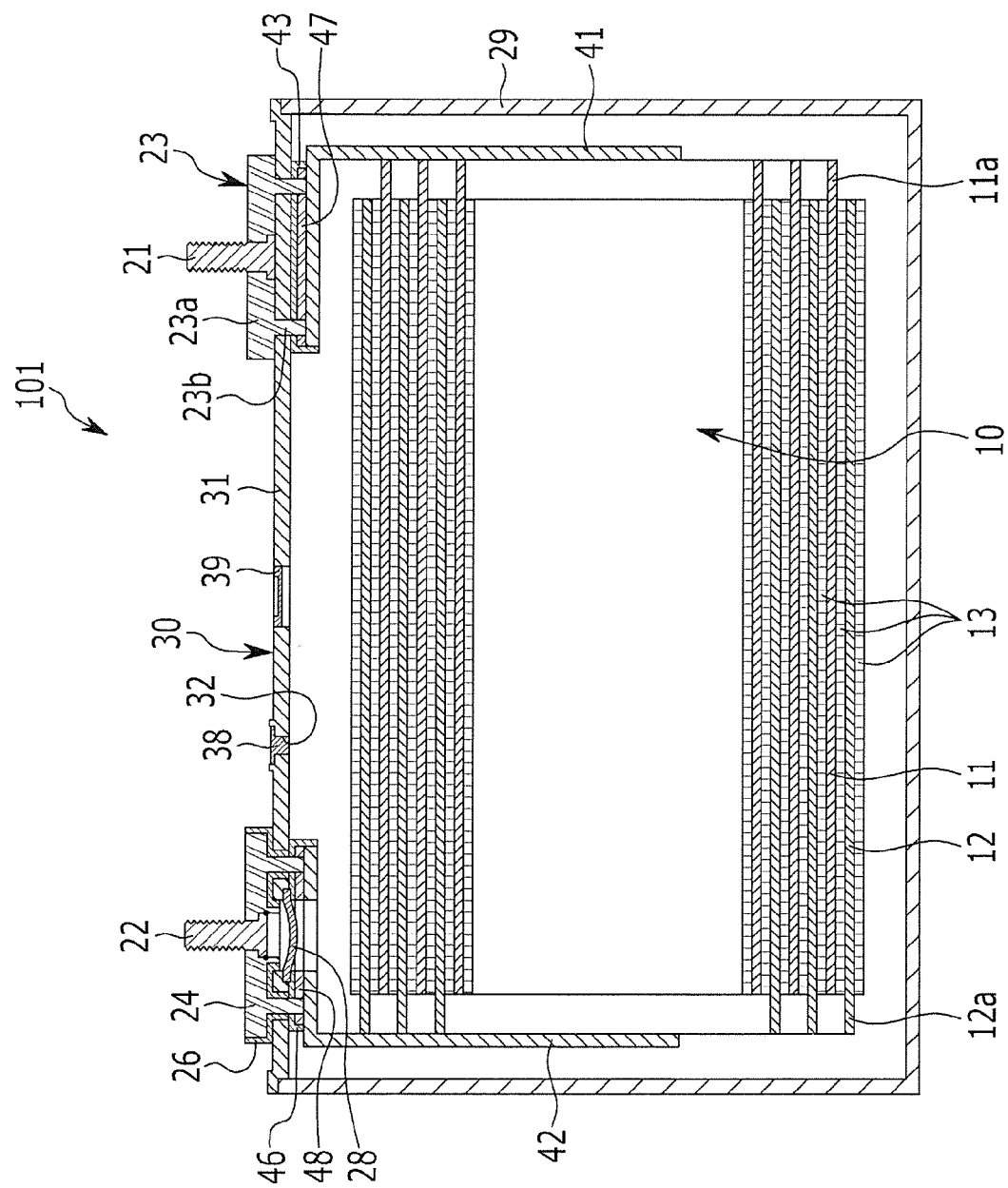
FIG. 2 is a cross-sectional view of the rechargeable battery taken along line II-II of FIG. 1.

FIG. 1 is a perspective view illustrating a rechargeable battery according to a first embodiment of the present invention, and FIG. 2 is a cross-sectional view of the rechargeable battery of FIG. 1 taken along line II-II of FIG. 1.

Referring to FIG. 1 and FIG. 2, a rechargeable battery 100 according to a first embodiment of the present invention includes: an electrode assembly 10 that is spiral-wound by stacking (or sandwiching) a separator 13 between a positive electrode 11 and a negative electrode 12; a case 29 housing the electrode assembly 10; and a cap assembly 30 that is coupled to an opening of the case 29.

The rechargeable battery 100 according to the first embodiment is a lithium ion rechargeable battery and has a quadrangular shape. However, embodiments of the present invention are not limited thereto, and the present invention can be applied to various forms of batteries such as a lithium polymer battery or a cylindrical battery.

The positive electrode 11 and the negative electrode 12 each include a coated region, which is a region that is coated with an active material, and uncoated regions 11a and 12a, which are regions that are not coated with an active material, in a current collector that is formed from a thin plate of metal foil. The positive uncoated region 11a is formed at one side end of the positive electrode 11 along a length direction of the positive electrode 11, and the negative uncoated region 12a is formed at the other side end (e.g., the opposite side) of the negative electrode 12 along a length direction of the negative electrode 12. The positive electrode 11 and the negative electrode 12 are spiral-wound with a separator 13, which is an insulator, located between the positive electrode 11 and the negative electrode 12.

However, embodiments of the present invention are not limited thereto, and the electrode assembly 10 may be formed in a structure in which a positive electrode and a negative electrode are formed as a plurality of sheets that are alternately stacked with a separator (or a plurality of separators) located between the alternately stacked sheets.

The case 29 is formed to have a cuboidal quadrangular shape having an opening at one side thereof. The case 29 may be formed of a metal such as aluminum, stainless steel, or the like.

The cap assembly 30 includes a cap plate 31 that covers the opening of the case 29, a first terminal 23 that protrudes to the outside of the cap plate 31 and that is electrically connected to the positive electrode 11, and a second terminal 24 that protrudes to the outside of the cap plate 31 and that is electrically connected to the negative electrode 12.

The cap plate 31 is formed as a thin plate extended longer in one direction than the other, and is coupled to the opening of the case 29. A seal stopper 38 is installed in an electrolyte injection opening 32 of the cap plate 31, and a vent member 39 having a notch 39a adapted to fracture at a threshold pressure is installed in a vent hole of the cap plate 31.

The first terminal 23 and the second terminal 24 protrude above the cap plate 31.

That is, the first terminal 23 is electrically connected to the positive electrode 11 via a first current collecting member 41, and the second terminal 24 is electrically connected to the negative electrode 12 via a second current collecting member 42. However, embodiments of the present invention are not limited thereto, and the first terminal 23 may be electrically connected a negative electrode, and the second terminal 24 may be electrically connected to a positive electrode.

The first terminal 23 includes an upper support portion 23a formed in a plate shape and fixing portions 23b protruding downward from the upper support portion 23a.

The upper support portion 23a has two fixing portions. The fixing portions 23b are formed in a column-like (e.g., cylindrical) shape, and protrude downward through the cap plate 30. However, embodiments of the present invention are not limited thereto, and two or more fixing portions 23b may be formed.

A column-like (e.g., cylindrical) connecting terminal 21 protruding upward from the first terminal 23 is inserted into the first terminal 23. The connecting terminal 21 may be made of stainless steel having high strength. The connecting terminal 21 is configured to be connected to a busbar when forming an battery module by electrically connecting rechargeable batteries.

The first terminal 23 is disposed to be in direct contact with the cap plate 31, and accordingly the cap plate 31 is positively charged (e.g., is at the voltage of the positive terminal). In other embodiments of the present invention, the cap plate is negatively charged (e.g., at the voltage of the negative terminal), e.g., when the first terminal is coupled to the negative electrode 12.

A support plate 47 is located under the cap plate 31, and a lower insulating member 43 is located on the support plate 47, between the support plate 47 and the cap plate 31. The lower insulating member 43 covers the top parts of the support plate 47 and the first current collecting member 41. The fixing portions 23b pass through the support plate 47 and the lower insulating member 43 and are riveted to the support plate 47. The fixing portions 23b, being inserted into holes, are fixed to the support plate 47 as the lower ends are widely spread. The fixing portions 23b may also be fixed to the support plate 47 by welding.

The first current collecting member 41 is fixed to the support plate 47 by welding or the like, and electric current is transferred to the first terminal 23 through the support plate 47. As shown in the embodiment of FIG. 2, when a plurality of fixing portions 23b are formed in the first terminal 23, which pass through the cap plate 31 and are riveted to the support plate 47, the side edges of the lower insulating member 43 are not spaced apart from (e.g., are in close contact with) the cap plate 31. Moreover, because the first current collecting member 41 is fixed to the support plate 47 which is fixed by the fixing portions 23b, the support plate 47 can be protected or prevented from being shaken due to external impact or vibration.

Figure 3:
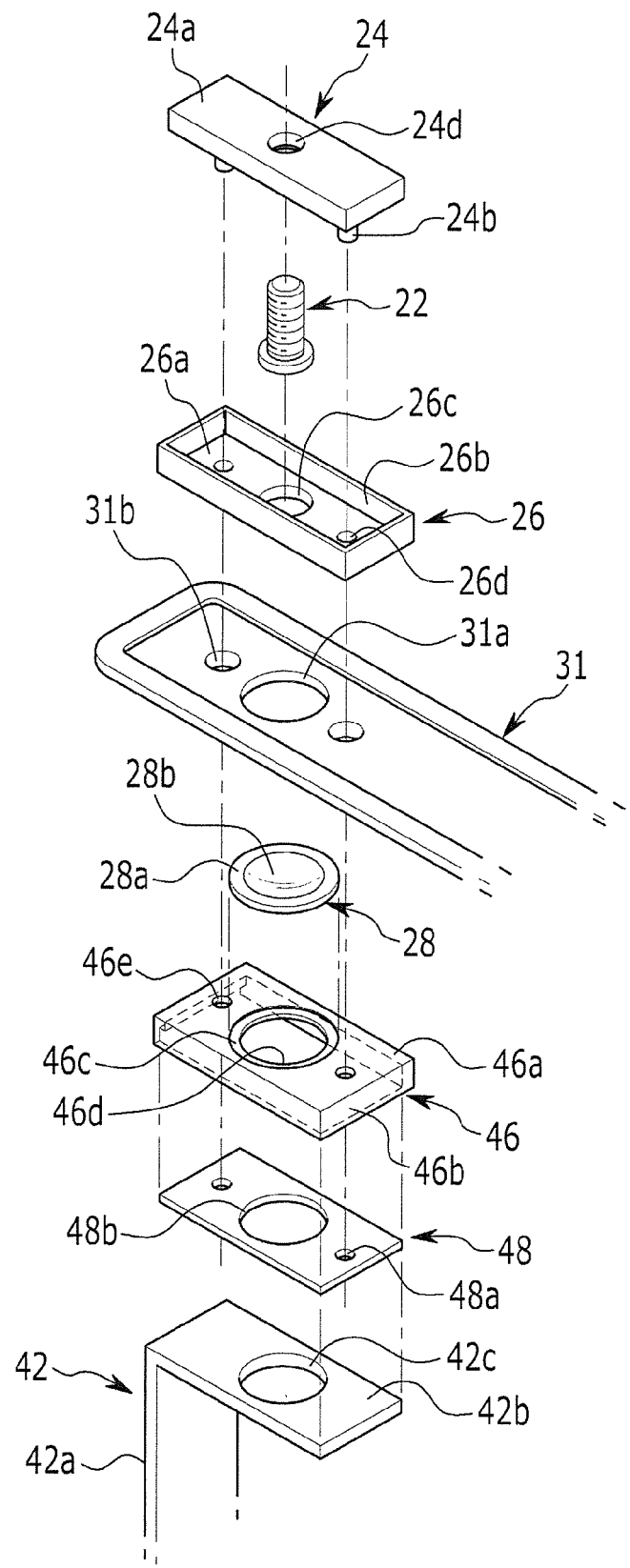
FIG. 3 is an exploded perspective view illustrating part of the rechargeable battery according to the first embodiment of the present invention.
Figure 4:
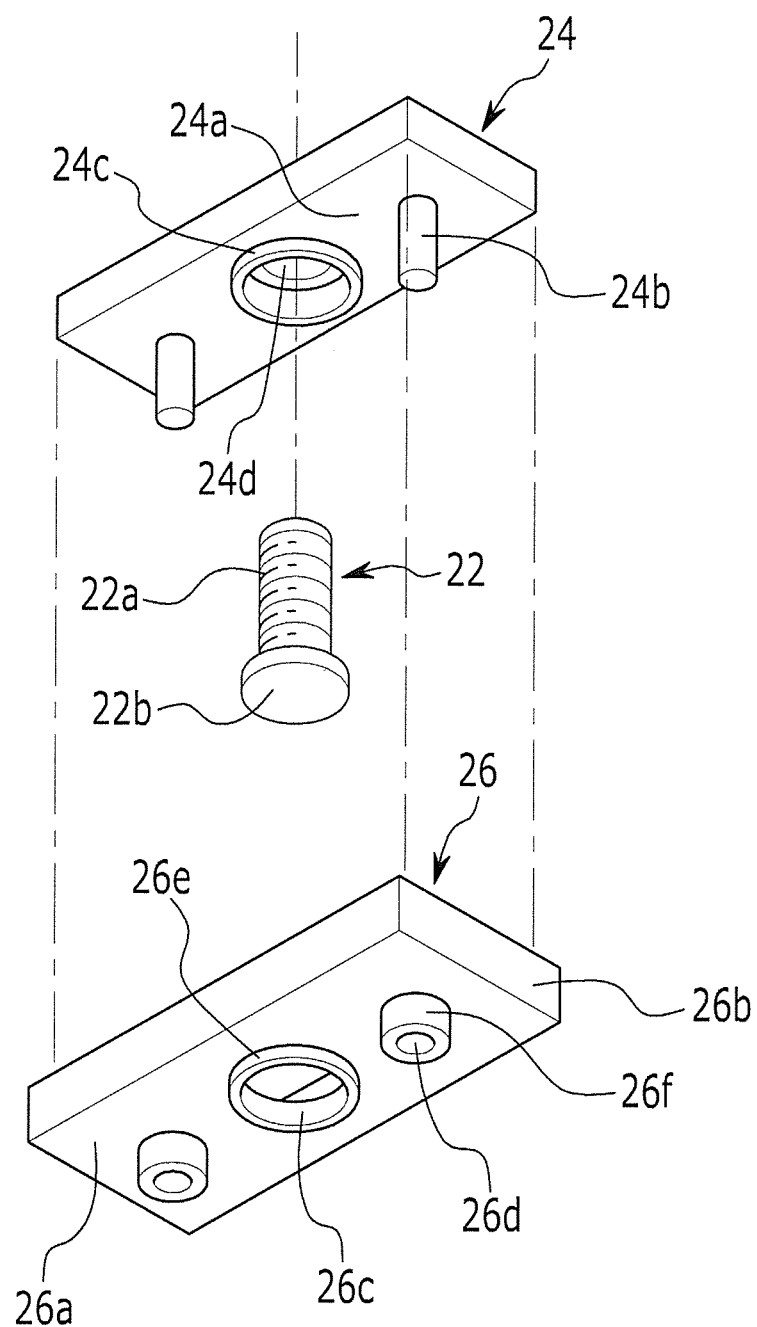
FIG. 4 is an exploded perspective view illustrating a second terminal, a connecting terminal, and an upper insulating member according to the first embodiment of the present invention.

FIG. 3 is an exploded perspective view illustrating part of the rechargeable battery according to the first embodiment of the present invention, and FIG. 4 is an exploded perspective view illustrating a second terminal, a connecting terminal, and an upper insulating member according to the first embodiment of the present invention.

As shown in FIG. 3 and FIG. 4, the second terminal 24 includes an upper support portion 24a formed in a plate shape and fixing portions 24b protruding downward from the upper support portion 24a. The upper support portion 24a has a hole 24d in which the connecting terminal 22 is inserted, and a short-circuit protrusion 24c penetrating through a short-circuit hole 31a of the cap plate 31 is formed around the hole 24d.

The connecting terminal 22 is inserted through the hole 24d. The connecting terminal 22 includes a terminal column 22a protruding outward through the second terminal 24 and a flange portion 22b at the bottom end of the terminal column 22a. The flange portion 22b is inserted in a recess formed around the hole 24d and fixed to the bottom of the second terminal 24 by welding or the like.

The fixing portions 24b are formed to have a column (e.g., cylindrical) shape, and protrude downward through the cap plate 31. The two fixing portions 24b are coupled to the upper support portion 24a, spaced apart from each other, in a lengthwise direction (e.g., along the long axis) of the upper support portion 24a. However, embodiments of the present invention are not limited thereto, and the second terminal 24 may have two or more fixing portions.

An upper insulating member 26 is located between the upper support portion 24a and the cap plate 31. The upper insulating member 26 includes a plate portion 26a and a sidewall 26b that extends and protrudes from the side edges of the plate portion 26a and encloses the side edges of the upper support portion 24a. A hole 26c in which the short-circuit protrusion 24c is inserted is formed in the plate portion 26a, and a first insulating protrusion 26e disposed between the short-circuit protrusion 24c and the inner surface of the short-circuit hole 31a protrudes downward from the edge of the hole 26c.

Holes 26d through which the fixing portions 24b are respectively inserted are formed in the plate portion 26a, and second insulating protrusions 26f protruding downward and insulating between the fixing portions 24b and the cap plate 31 are respectively formed along the edges of the holes 26d.

The short-circuit hole 31a through which the short-circuit protrusion 24c is inserted and holes 31b through which the fixing portions 24b are respectively inserted are formed in the cap plate 31. A short-circuit member 28 which is adapted to be deformed at a set (or particular) pressure to be connected to the short-circuit protrusion 24c is located under the short-circuit hole 31a.

The short-circuit member 28 is electrically connected to the cap plate 31 which is electrically connected to the positive electrode 11. When the internal pressure of the rechargeable battery 101 rises, the short-circuit 28 is deformed and is connected to the short-circuit protrusion 24c.

The short-circuit member 28 is formed in a circular plate shape, and includes a peripheral portion 28a and a curved portion 28b formed inside the peripheral portion 28a and curved downward in an arc shape. The peripheral portion 28a is located between the cap plate 31 and the lower insulating member 46.

The support plate 48 and the lower insulating member 46 are located under the cap plate 31. The support plate 48 is formed of an electrically conductive metal plate and has holes 48a through which the fixing portions 24b are respectively inserted. A hole 48b positioned under the short-circuit member 28 is also formed in the support plate 48.

The lower insulating member 46 is disposed between the support plate 48 and the cap plate 31, and covers the top parts of the support plate 48 and the second current collecting member 42. The lower insulating member 46 includes a plate portion 46a and a sidewall 46b that extends along the side edges of the plate portion 46a and protrudes downward. A hole 46d positioned under the short-circuit member 28 is formed in the plate portion 46a, and a recess 46c in which the short-circuit member 28 is inserted is formed around the hole 46d. Holes 46e in which the fixing portions 24b are respectively inserted are formed in the plate portion 46a.

The second current collecting member 42 includes an electrode connecting portion 42a electrically connected to the negative electrode 12 (e.g., the uncoated portion 12a of the negative electrode 12) of the electrode assembly 10 and a terminal connecting portion 42b bent from the electrode connecting portion 42a and brought into contact with the support plate 48. A hole 42c communicating with (e.g., aligned with) the holes 46d and 48b is formed in the terminal connecting portion 42b. Accordingly, the pressure in the case 29 can be easily transferred to the short-circuit member 28 through the holes 46d, 48b, and 42c.

In this manner, according to one embodiment of the present invention, when the pressure in the case 29 increases and the short-circuit member 28 is deformed, the short-circuit member 28 and the second terminal 24 are electrically connected with each other through the short-circuit protrusion 24c formed on the second terminal 24. Thus, when the pressure rises, the positive electrode and the negative electrode can be easily short-circuited without installing a short-circuit tab.

The fixing portions 24b pass through the lower insulating member 46 and the support plate 48 and are riveted to the support plate 48. The fixing portions 24b, being inserted through the holes 48a, are fixed to the support plate 48 because the lower ends of the fixing portions 24b are spread apart to have wide end portions (e.g., the wide end portions may be wider than corresponding ones of the holes 48a). The fixing portions 24b may be fixed to the support plate 48 by welding and/or being riveted thereto.

The terminal connecting portion 42b is fixed to the support plate 48 by welding or the like, and electric current is transferred to the second terminal 24 through the support plate 48.

As shown in the embodiment illustrated in FIG. 3, when a plurality of fixing portions 24b are formed in the second terminal 24, which pass through the cap plate 31 and are riveted to the support plate 48, the side edges of the lower insulating member 46 are not spaced apart from (e.g., they are in close contact with) the cap plate 31. Moreover, as the second current collecting member 42 is fixed to the support plate 48 being fixed by the fixing portions 24b, the support plate 48 can be protected or prevented from being shaken due to external impact or vibration.

Figure 5:
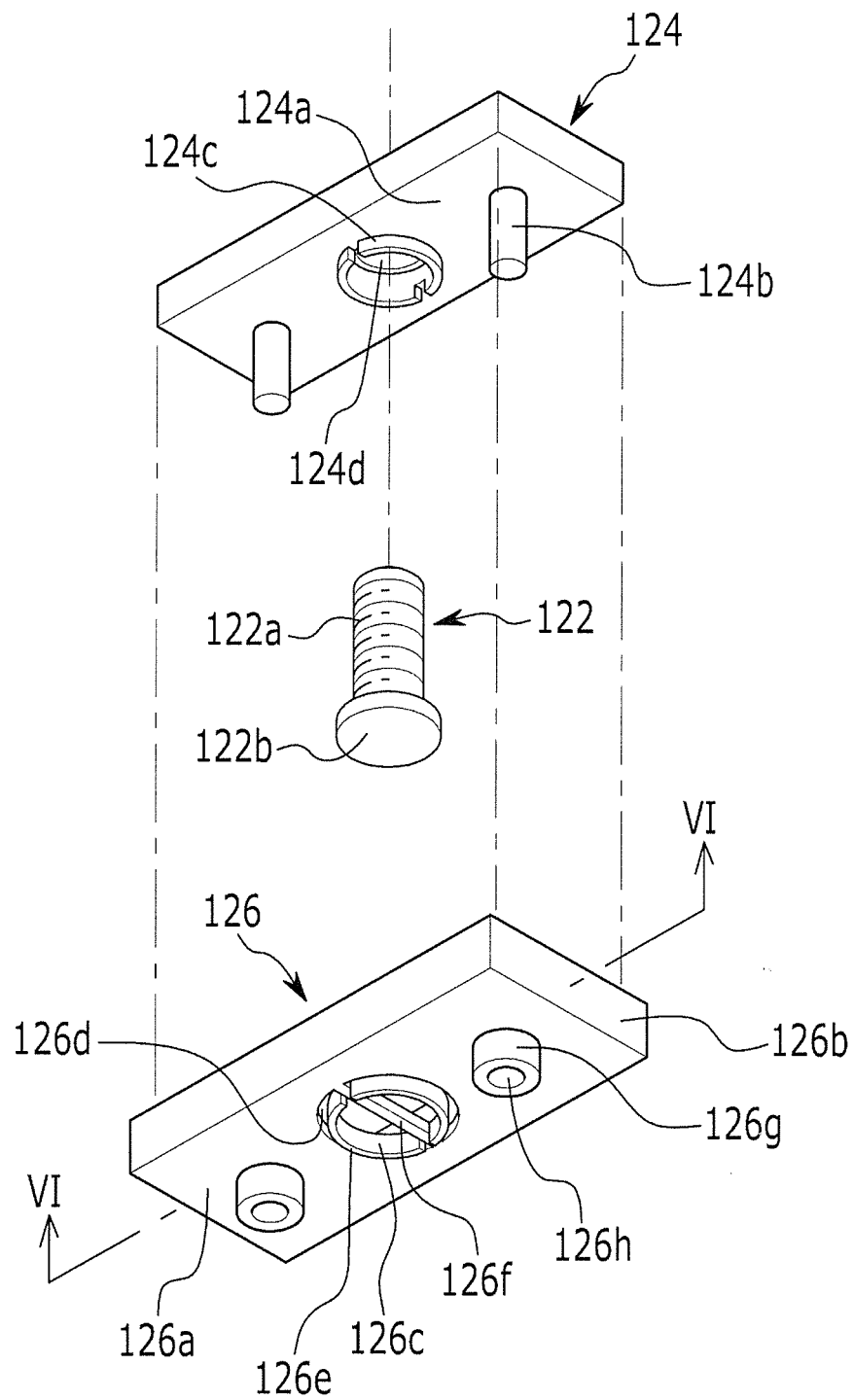
FIG. 5 is an exploded perspective view illustrating a rechargeable battery according to a second embodiment of the present invention.
Figure 6:
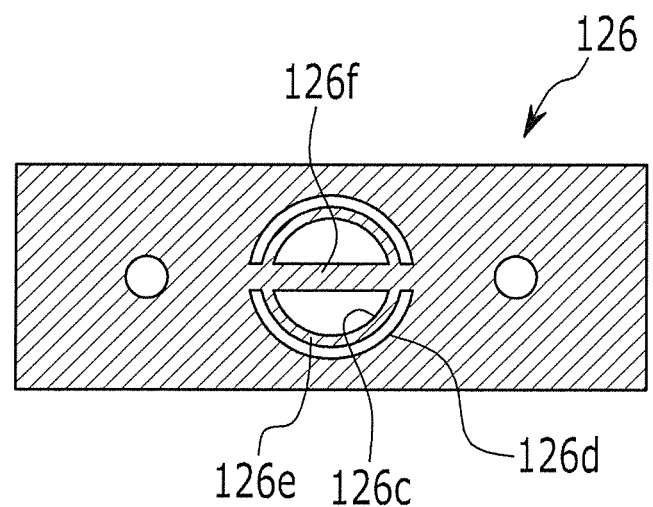
FIG. 6 is a transverse cross-sectional view of the upper insulating member taken along line VI-VI of FIG. 5.

FIG. 5 is an exploded perspective view illustrating a second terminal and an upper insulating member according to a second embodiment of the present invention, and FIG. 6 is a transverse cross-sectional view of the upper insulating member taken along line VI-VI of FIG. 5.

Referring to FIG. 5 and FIG. 6, the rechargeable battery according to the embodiment illustrated in FIG. 5 and FIG. 6 may have the same structure as the rechargeable battery according to the first embodiment illustrated in FIGS. 1, 2, 3, and 4 as described above, except for the structure of the second terminal 125 and the upper insulating member 126, so a repeated description of substantially similar structures will be omitted.

The second terminal 124 includes an upper support portion 124a formed in a plate shape and fixing portions 124b protruding downward from the upper support portion 124a. The upper support portion 124a has a hole 124d in which a connecting terminal 122 is inserted, and a short-circuit protrusion 124c penetrating through a short-circuit hole 31a formed in the cap plate 31 is formed at the edge of the hole 124d. The short-circuit protrusion 124c includes two protrusions each having an arc shape, and the two protrusions are disposed facing each other, spaced apart at an interval (e.g., a predetermined interval).

The connecting terminal is inserted through the hole 124d. The connecting terminal 122 includes a terminal column 122a protruding outward through the second terminal 124 and a flange portion 122b located at the bottom end of the terminal column 122a. The flange portion 122b is inserted in a recess formed around (e.g., at the edge of) the hole 124d and fixed to the bottom of the second terminal 124 by welding or the like.

The fixing portions 124b are formed to have a column (e.g., cylindrical) shape and protrude downward through the cap plate 30. Two fixing portions 124b are formed on the upper support portion 124a.

An upper insulating member 126 is located between the upper support portion 124a and the cap plate 31. The upper insulating member 126 includes a plate portion 126a and a sidewall 126b that extends from the side edges of the plate portion 126a and encloses the side edges of the upper support portion 124a. A first insulating protrusion 126e disposed between the short-circuit protrusion 124c and the cap plate 31 and second insulating protrusions 126g enclosing the fixing portions 124b are formed on the plate portion 126a. Holes 126h through which the fixing portions 124b are inserted are respectively formed inside the second insulating protrusions 126g.

The first insulating protrusion 126e includes two arcs spaced apart at an interval (e.g., a predetermined interval). A hole 126c (through which the short-circuit protrusion 124c is inserted) is formed inside the first insulating protrusion 126e, and a support portion 126f is formed across (e.g., intersecting or bisecting) the hole 126c. Buffer holes 126d are formed between the first insulating protrusion 126e and the plate portion 126a. Accordingly, the first insulating protrusion 126e is spaced apart from the plate portion 126a, and both ends of the first insulating protrusion 126e are fixed to the support portion 126f.

As shown in the second embodiment illustrated in FIG. 5, the bottom end of the connecting terminal 122 is brought into contact with the support portion 126f. Therefore, the connecting terminal 122 and the second terminal 124 can be stably kept coupled together.

Moreover, because the buffer holes 126d are formed between the first insulating protrusion 126e and the plate portion 126a, the first insulating protrusion 126e can be easily deformed in a width direction (e.g., in a direction toward the buffer holes 124d). Thus, the first insulating protrusion 126e can be easily positioned between the short-circuit protrusion 124c and the cap plate 31.

Figure 7:
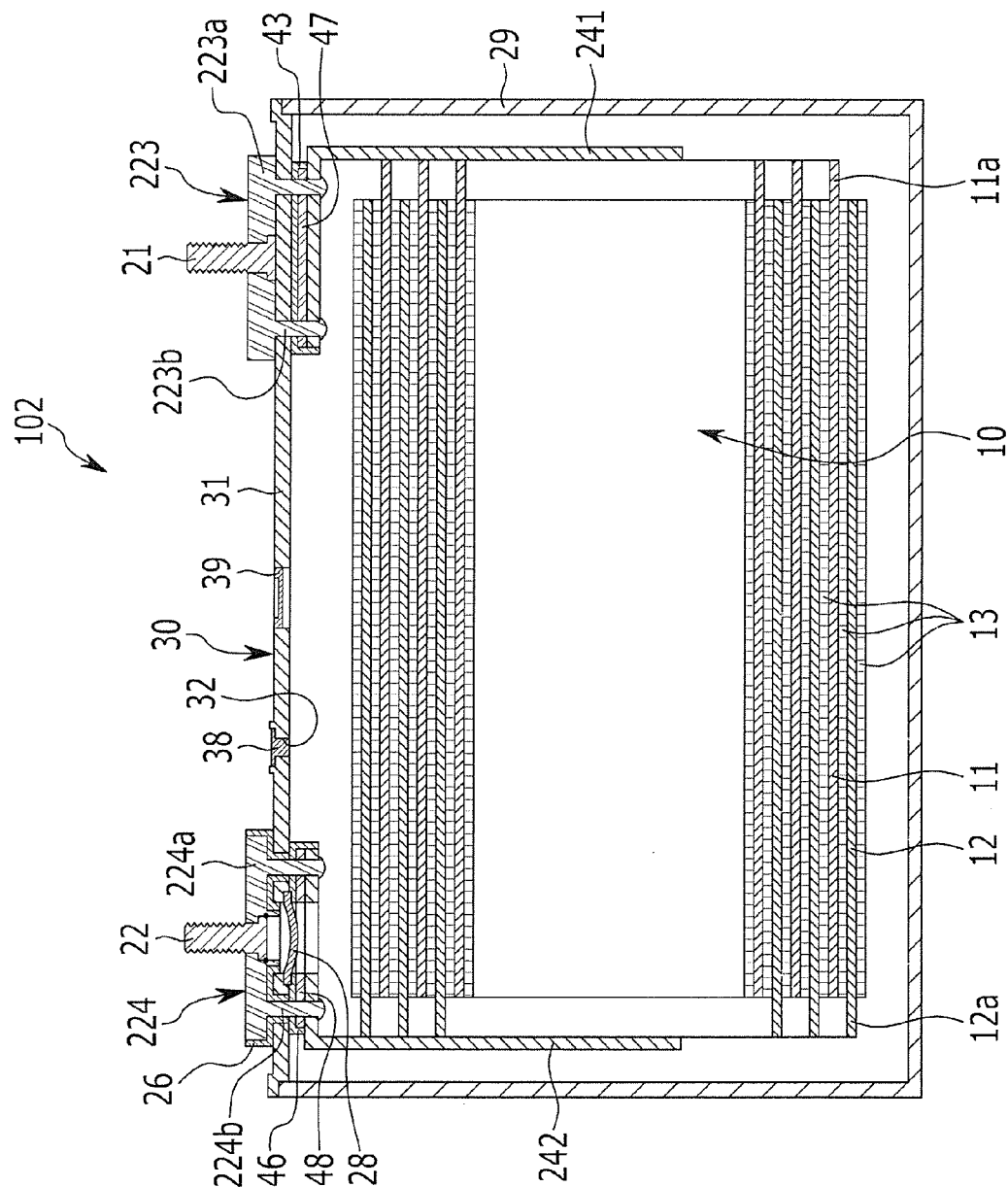
FIG. 7 is a cross-sectional view illustrating a rechargeable battery according to a third embodiment of the present invention.

FIG. 7 is a cross-sectional view illustrating a rechargeable battery according to a third embodiment of the present invention.

Referring to FIG. 7, the rechargeable battery according to the third embodiment of the present invention may have a substantially similar structure as the rechargeable battery according to the first embodiment as described above, except for the structure of the second terminal 223 and the upper insulating member 224, so a repeated description of substantially similar structures will be omitted.

The rechargeable battery 102 according to the third embodiment has a cap assembly 30 including a cap plate 31, a first terminal 223, and a second terminal 224.

The first terminal 223 has a plate portion 223a and fixing portions 223b protruding downward from the plate portion 223a. The fixing portions 223b extend through the cap plate 31, the lower insulating member 43, the support plate 47, and the first current collecting member 241, and are riveted to the support plate 47. A plurality of fixing portions 223b are formed on the first terminal 223, and the fixing portions 223b are fixed to the first current collecting member 241 by welding and/or being riveted to the first current collecting member 241.

The second terminal 224 has a plate portion 224a and fixing portions 224b protruding downward from the plate portion 224a. The fixing portions 224b extend through the upper insulating member 26, the cap plate 31, the lower insulating member 46, the support plate 48, and the second current collecting member 242, and are riveted to the second current collecting member 242. A plurality of fixing portions 224b are formed on the second terminal 224, and the fixing portions 224b are fixed to the second current collecting member 242 by welding, being riveted to the second current collecting member 242.

In this manner, according to the third embodiment of the present invention, the fixing portions 223b and 224b formed on the first terminal 223 and the second terminal 224 pass through the first and second current collecting members 241 and 242, and are riveted to the first and second current collecting members 241 and 242. Hence, the coupling between the terminals 223 and 224 and the support plates 47 and 48 is strengthened.

Figure 8:
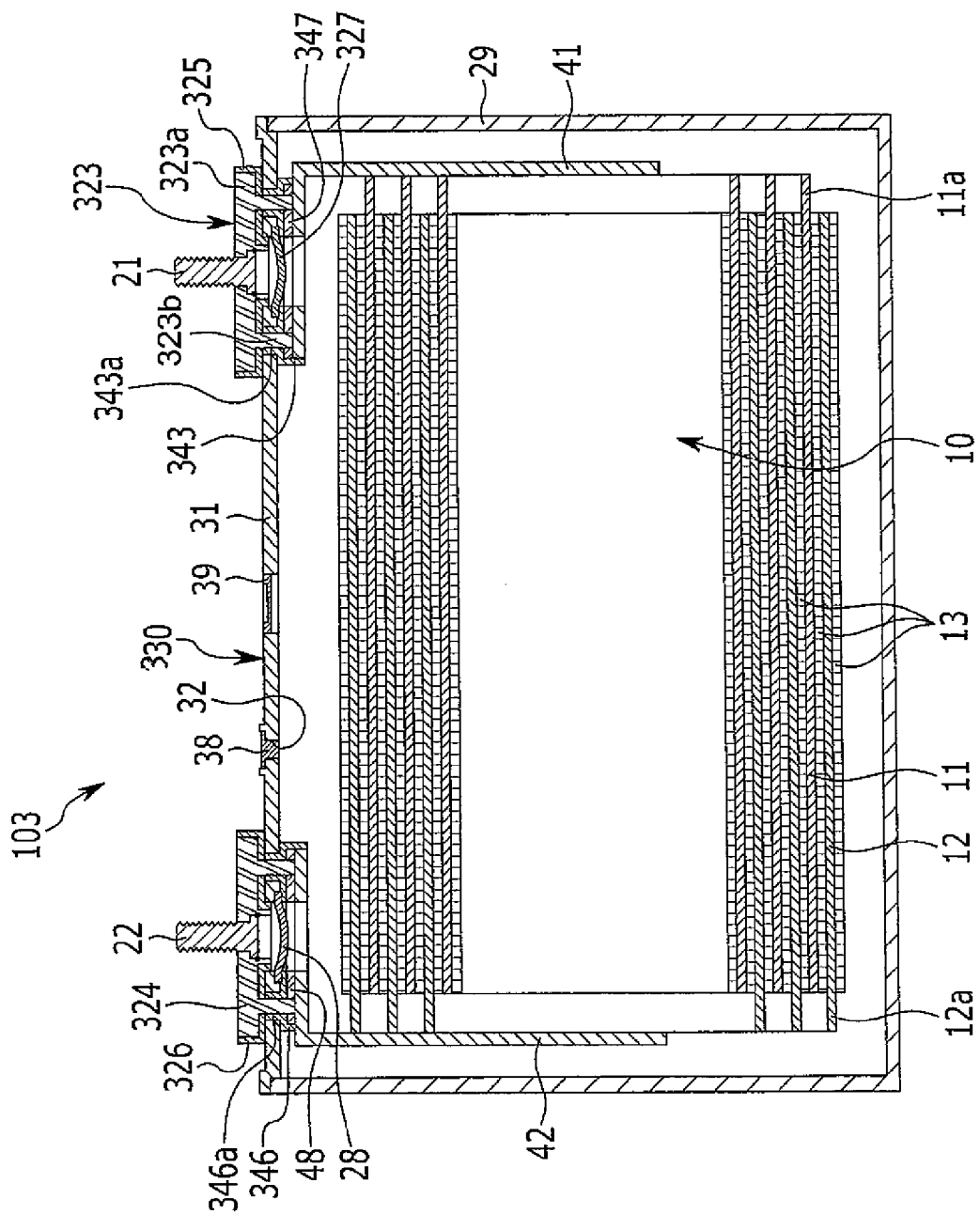
FIG. 8 is a cross-sectional view illustrating a rechargeable battery according to a fourth embodiment of the present invention.
Figure 9:
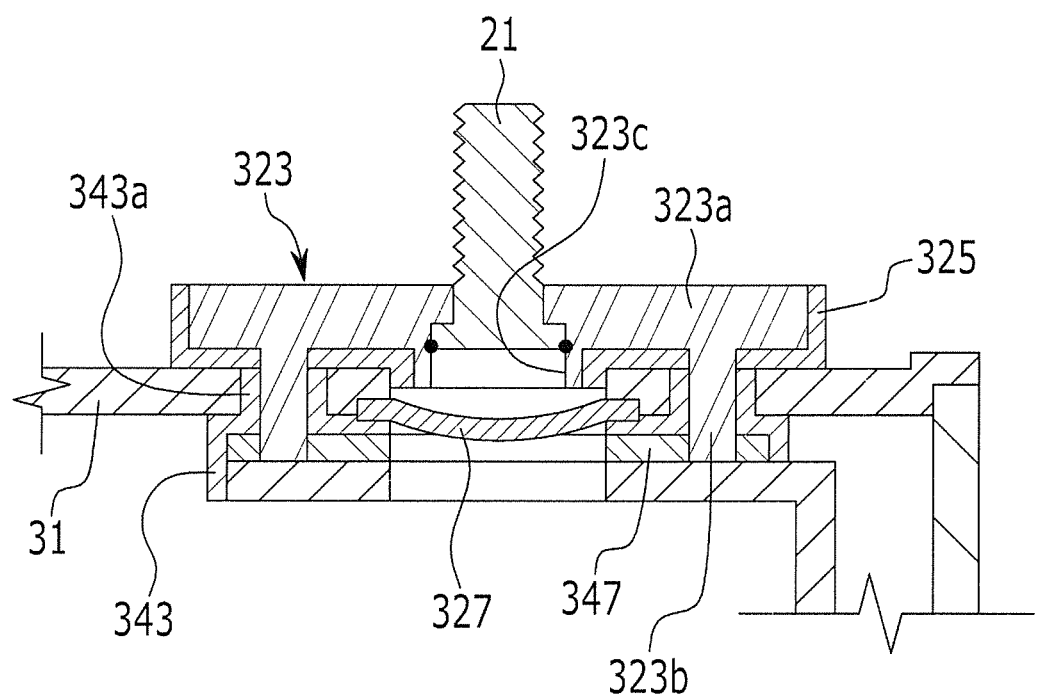
FIG. 9 is a partial cross-sectional view illustrating part of the rechargeable battery according to the fourth embodiment of the present invention.

FIG. 8 is a cross-sectional view illustrating a rechargeable battery according to a fourth embodiment of the present invention, and FIG. 9 is a partial cross-sectional view illustrating part of the rechargeable battery according to the fourth embodiment of the present invention.

Referring to FIG. 8 and FIG. 9, the rechargeable battery according to the fourth embodiment of the present invention may have substantially the same structure as the rechargeable battery according to the first embodiment as described above, except for the structure of the cap assembly 330, so a repeated description of substantially similar structures will be omitted.

The cap assembly 330 includes a cap plate 31 that covers the opening of the case 29, a first terminal 323 that protrudes to the outside of the cap plate 31 and is electrically connected to the positive electrode 11, and a second terminal 324 that protrudes to the outside of the cap plate 31 and is electrically connected to the negative electrode 12.

That is, the first terminal 323 is electrically connected to the positive electrode 11 via a first current collecting member 41, and the second terminal 324 is electrically connected to the negative electrode 12 via a second current collecting member 42.

The first terminal 323 includes an upper support portion 323a formed in a plate shape and fixing portions 323b protruding downward from the upper support portion 323a. A connecting terminal 21 is inserted through the upper support portion 323a, and a short-circuit protrusion 323c passing through the terminal hole formed in the cap plate 31 is formed on the lower surface of the upper support portion 323a.

The fixing portions 323b are formed to have a column-like (e.g., cylindrical) shape and protrude downward through the cap plate 31. Two fixing portions 323b are formed on the upper support portion 323a.

An upper insulating member 325 is located between the upper support portion 323a and the cap plate 31. The upper insulating member 325 includes a plate portion and a sidewall that extends and protrudes from the side edges of the plate portion and encloses the side edges of the upper support portion 323a. A hole in which the short-circuit protrusion is inserted is formed in the plate portion, and a first insulating protrusion, disposed between the short-circuit protrusion 323c and the cap plate 331, protrudes downward around the hole.

A short-circuit hole in which the short-circuit protrusion 323c is inserted and holes in which the fixing portions 323b are inserted are formed in the cap plate 31. A short-circuit member 327 which is adapted to be deformed at a pressure (e.g., a set pressure) and connected to the short-circuit protrusion 323c is located under the short-circuit hole. The short-circuit member 327 has substantially the same structure as the short-circuit member 28 according to the first embodiment.

A support plate 347 is located under the cap plate 31, and a lower insulating member 343 disposed between the support plate 347 and the cap plate 331 is located on the support plate 347. The support plate 347 is formed of an electrically conductive metal plate, and has holes in which the fixing portions 323b are respectively inserted. A hole positioned under the short-circuit member 327 is formed in the support plate 347.

The lower insulating member 343 covers the top parts of the support plate 347 and current collecting member 41. The lower insulating member 343 includes a plate portion and a sidewall that protrudes downward along the side edges of the plate portion. A hole positioned under the short-circuit member and holes in which the fixing portions 323b are inserted are formed in the plate portion. Second insulating protrusions 343a protruding upward (e.g., through the cap plate 31) and located between the fixing portions 323b and the cap plate 31 to insulate between the fixing portions 323b and the cap plate 331 are respectively formed around the holes.

The fixing portions 323b pass through the lower insulating member 343 and the support plate 347 and are riveted to the support plate 347. The fixing portions 323b, being inserted into the holes of the support plate 347, are fixed to the support plate 347 as the lower ends of the fixing portions 323b are spread apart to have wide end portions (e.g., the wide end portions may be wider than corresponding ones of the holes of the support plate 347). The fixing portions 323b may be fixed to the support plate 347 by welding and/or being riveted thereto.

The second terminal 324 has a plate portion, fixing portions, and a short-circuit protrusion, and has substantially the same structure as the second terminal according to the first embodiment. The connecting terminal 22 is inserted through the second terminal 324.

The upper insulating member 326 is located between the upper support portion of the second terminal 324 and the cap plate 31. The upper insulating member 326 includes a plate portion and a sidewall that protrudes from the side edges of the plate portion and encloses the side edges of the upper support portion. A hole through which the short-circuit protrusion is inserted is formed in the plate portion, and a first insulating protrusion, disposed between the short-circuit protrusion and the cap plate, protrudes downward around the hole.

A short-circuit hole (through which the short-circuit protrusion is inserted) and holes (in which the fixing portions are inserted) are formed in the cap plate 31. A short-circuit member 28, which is adapted to be deformed at a pressure (e.g., a set pressure) so as to be connected to the short-circuit protrusion, is located under the short-circuit hole.

The short-circuit member 28 has substantially the same structure as the short-circuit member according to the first embodiment.

A support plate 48 is disposed under the cap plate 31, and a lower insulating member 346 is located between the support plate 48 and the cap plate. The support plate 48 is formed of an electrically conductive metal plate and has holes through which the fixing portions are respectively inserted. A hole positioned under the short-circuit member 28 is formed in the support plate 48.

The lower insulating member 346 covers the top parts of the support plate 48 and the second current collecting member 42. The lower insulating member 343 covers the top parts of the support plate and current collecting member. The upper insulating member 326 includes a plate portion and a sidewall that extends along the side edges of the plate portion.

A hole positioned under the short-circuit member 28 and other holes (in which the fixing portions are inserted) are formed in the plate portion. Second insulating protrusions 346a protruding upward and located between the fixing portions and the cap plate to insulate between the fixing portions and the cap plate 31 are respectively formed around the holes. The fixing portions pass through the support plate 48 and the lower insulating member 346 and are riveted to the support plate 48.

In this manner, according to the fourth embodiment, the short-circuit members 28 and 327 are respectively located on the first terminal 323 and the second terminal 324, and the cap plate 331 is electrically neutral (e.g., floating). Therefore, the cap plate 331 or the case 29 can be protected or prevented from being positively charged and oxidized.

Moreover, the support plates 48 and 347 are respectively located on the bottom parts of the positive electrode 323 and negative electrode 324, and the support plates 48 and 347 are fixed by the fixing portions. This prevents or protects the side edges of the lower insulating members 343 and 346 from being spaced apart from the cap plate 331.

When the internal pressure of the rechargeable battery 103 rises, the short-circuit members 28 and 327 located on the first terminal 323 and the second terminal 324 are deformed, thereby causing the short-circuit member 327 to be electrically connected to the first terminal 323 and the short-circuit member 28 to be electrically connected to the second terminal 324. Therefore, the first terminal 323 and the second terminal 324 are electrically short-circuited by the short-circuit members 28 and 327 connected to the cap plate 31.

When short-circuiting occurs, current charged in the rechargeable battery 103 is discharged and the rechargeable battery 103 is no longer charged and discharged. This can prevent or protect the rechargeable battery 103 from being exploded or ignited due to a rise in the internal pressure of the rechargeable battery 103.

Figure 10:
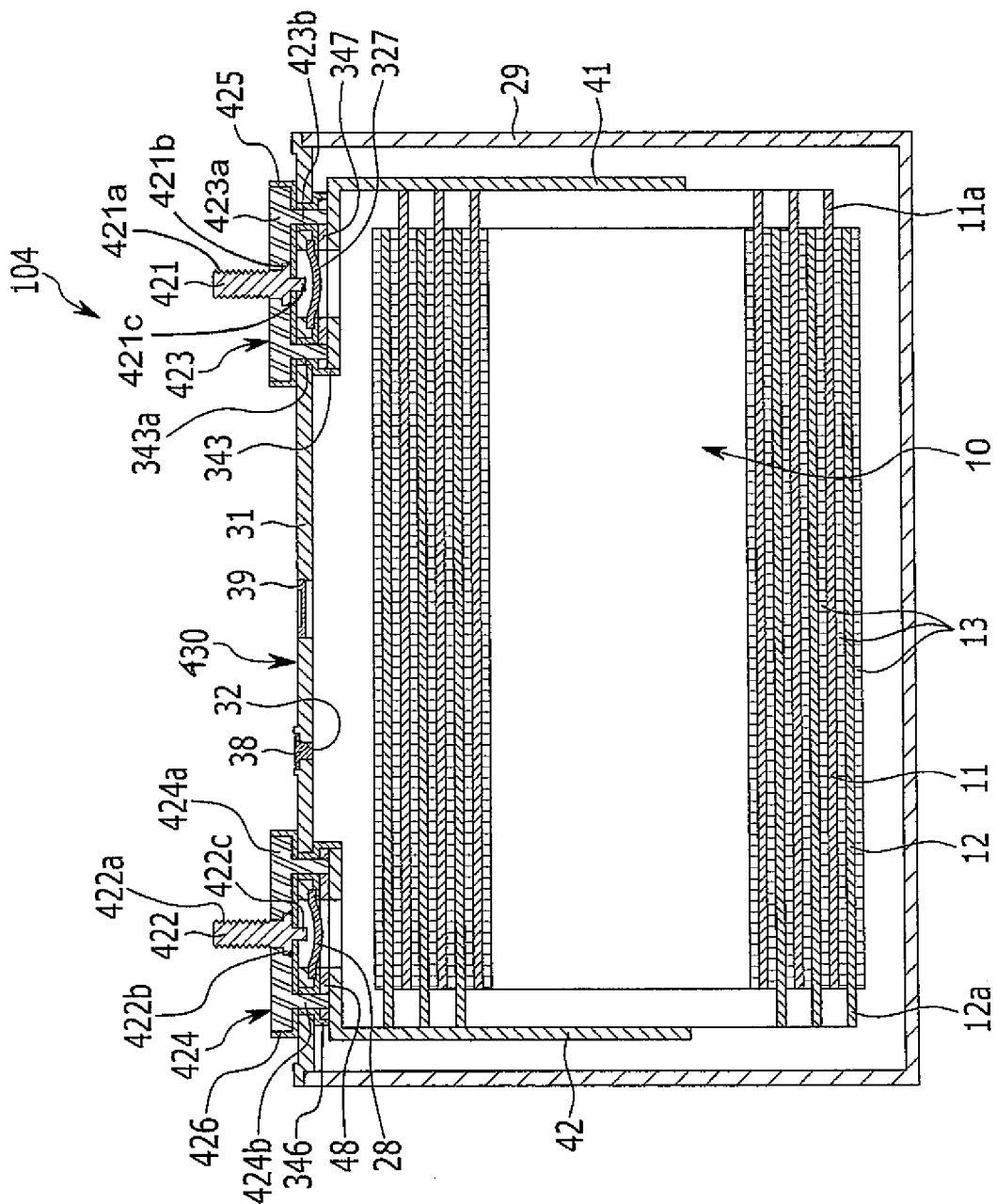
FIG. 10 is a cross-sectional view illustrating a rechargeable battery according to a fifth embodiment of the present invention.

FIG. 10 is a cross-sectional view illustrating a rechargeable battery according to a fifth embodiment of the present invention.

The rechargeable battery 104 according to the fifth embodiment may have substantially the same structure as the rechargeable battery according to the fourth embodiment as described above, except for the structure of the cap assembly, so a repeated description of substantially similar structures will be omitted.

The cap assembly 430 includes a cap plate 31 that covers the opening of the case 29, a first terminal 423 that protrudes to the outside of the cap plate 31 and is electrically connected to the positive electrode 11, and a second terminal 424 that protrudes to the outside of the cap plate 31 and is electrically connected to the negative electrode 12.

That is, the first terminal 423 is electrically connected to the positive electrode 11 via a first current collecting member 41, and the second terminal 424 is electrically connected to the negative electrode 12 via a second current collecting member 42.

The first terminal 423 includes an upper support portion 423a formed in a plate shape and fixing portions 423b protruding downward from the upper support portion 423a. A connecting terminal 421 is inserted through the upper support portion 423a.

The fixing portions 423b having a column-like (e.g., cylindrical) shape protrude downward through the cap plate 31. According to one embodiment of the present invention, two fixing portions 423 spaced apart in a lengthwise direction of the support plate portion 423a are formed on the upper support portion 423a.

The connecting terminal 421 includes a terminal flange 421b, a terminal column 421a protruding upward from the terminal flange 421b, and a short-circuit protrusion 421c protruding downward from the lower surface of the terminal flange 421b.

An upper insulating member 425 is located between the upper support portion 423a and the cap plate 31. The upper insulating member 425 includes a plate portion and a sidewall that extends and protrudes from the side edges of the plate portion and encloses the side edges of the upper support portion. A hole through which the short-circuit protrusion 421c is inserted and holes through which the fixing portions are inserted are formed in the plate portion.

A short-circuit member 327 which is adapted to be deformed at a pressure (e.g., a set pressure) so as to be brought into contact with the short-circuit protrusion 421c, is located on the cap plate 31. The short-circuit member 327 has substantially the same structure as the short-circuit member 28 according to the first embodiment.

A support plate 347 is located under the cap plate 431, and a lower insulating member 343 is located between the support plate 347 and the cap plate 331. The support plate 347 and the lower insulating member 343 have substantially the same structure as the support plate and the lower insulating member according to the fourth embodiment.

The second terminal 424 includes an upper support portion 424a formed in a plate shape and fixing portions 424b protruding downward from the upper support portion 424a. A connecting terminal 422 is inserted through the upper support portion 424a.

The fixing portions 424b having a column-like (e.g., cylindrical) shape protrude downward through the cap plate 31. Two fixing portions 424b spaced apart in a lengthwise direction of the upper support portion 424a are formed in the upper support portion 424a.

The connecting terminal 422 includes a terminal flange 422b, a terminal column 422a protruding upward from the terminal flange 422b, and a short-circuit protrusion 422c protruding downward from the lower surface of the terminal flange 422b.

An upper insulating member 426 is located between the upper support portion 424a and the cap plate 31. The upper insulating member 426 includes a plate portion and a sidewall that extends and protrudes from the side edges of the plate portion and encloses the side edges of the upper support portion 424a. A hole through which the short-circuit protrusion is inserted and holes in which the fixing portions 424b are inserted are formed in the plate portion.

A short-circuit member 28, which is adapted to be deformed at a pressure (e.g., a set pressure) so as to be brought into contact with the short-circuit protrusion 422c, is located on the cap plate 431. The short-circuit member 28 has substantially the same structure as the short-circuit member 28 according to the first embodiment of the present invention.

A support plate 48 is located under the cap plate 31, and a lower insulating member 346 is located between the support plate 48 and the cap plate 31. The support plate 48 and the lower insulating member 346 have substantially the same structure as the support plate and the lower insulating member according to the fourth embodiment of the present invention.

In this manner, according to the fifth embodiment, short-circuit protrusions 421c and 422c are respectively formed on the connecting terminals 421 and 422. Thus, there is no need to form an insulating portion between the cap plate 431 and the short-circuit protrusions 421 and 422c. Moreover, the connecting terminals 421 and 422 and the short-circuit members 28 and 327 are electrically connected due to the deformation of the short-circuit members 28 and 327. Thus, when the internal pressure of the rechargeable battery 104 rises, this induces short circuiting, thereby protecting from or preventing explosion and ignition of the rechargeable battery 104.

In addition, this protection from battery explosions also improves the safety of an electric or hybrid electric vehicle containing the rechargeable battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

Description of selected reference numerals

| | |
|---|---|
| 101, 102, 103, 104: rechargeable battery | 10: electrode assembly |
| 11: positive electrode | 11a: positive uncoated region |
| 12: negative electrode | 12a: negative uncoated region |
| 13: separator | 21, 22: connecting terminal |
| 23, 223, 323, 423: first terminal | |
| 24, 124, 224, 324, 424: second terminal | |
| 22a: terminal column | 22b: flange portion |
| 23a, 24a: upper support portion | 23b, 24b: fixing portion |
| 24c: short-circuit protrusion | |
| 24d, 26c, 26d, 31b, 42c, 46d, 46e: hole | |
| 26: upper insulating member | 26a: plate portion |
| 26b: sidewall | 26e: first insulating protrusion |
| 26f: second insulating protrusion | 28: short-circuit member |
| 28a: peripheral portion | 28b: curved portion |
| 29: case | 30: cap assembly |
| 31: cap plate | 31a: short-circuit hole |
| 41, 42: first and second current collecting members | |
| 42a, 42b: electrode connecting portion | |
| 43, 46: lower insulating member | 46a: plate portion |
| 46b: sidewall | 46c: recess |

What is claimed is:

1. A rechargeable battery comprising:
an electrode assembly comprising a first electrode having a first polarity and a second electrode having a second polarity, the second polarity being different from the first polarity;
a case housing the electrode assembly;
a first terminal electrically connected to the first electrode and comprising a first short-circuit protrusion;
a first current collecting member electrically connected between the first electrode and the first terminal, the first current collecting member comprising an electrode connecting portion connected to the first electrode and a terminal connecting portion extending from the electrode connecting portion;
a cap plate coupled to an opening of the case and electrically connected to the second electrode, the first short-circuit protrusion protruding at least partially through a short-circuit hole in the cap plate;
a first lower insulating member between the first electrode and the cap plate; and
a first short-circuit member comprising a peripheral portion and a curved portion, electrically connected to the cap plate and arranged between the first terminal and the terminal connecting portion of the first current collecting member at the short-circuit hole, and configured to be deformed to electrically connect the first electrode to the second electrode via the cap plate such that, when a pressure inside the case is less than a deformation pressure of the first short-circuit member, the curved portion curves toward the electrode assembly, and when the pressure inside the case is greater than the deformation pressure, the curved portion curves toward and contacts the first short-circuit protrusion,
wherein the first terminal comprises a first fixing portion electrically connected to the first electrode.

2. The rechargeable battery of claim 1, further comprising a first upper insulating member between the first terminal and the cap plate.

3. The rechargeable battery of claim 2, wherein the first upper insulating member comprises:
a plate portion, the plate portion having a hole; and
a first insulating protrusion extending from an edge of the hole through the short-circuit hole in the cap plate,
wherein the first short-circuit protrusion extends through the hole.

4. The rechargeable battery of claim 3, wherein the first insulating protrusion comprises two arc portions spaced apart from one another, and
wherein the first upper insulating member further has two buffer holes, each of the buffer holes being located between a corresponding one of the arc portions and the plate portion.

5. The rechargeable battery of claim 4, wherein the first upper insulating member further comprises a support portion extending across the hole, the arc portions being coupled to the support portion.

6. The rechargeable battery of claim 3, wherein the first upper insulating member further comprises a sidewall extending from side edges of the plate portion and enclosing side edges of the first terminal.

7. The rechargeable battery of claim 3, wherein the first upper insulating member further comprises a second insulating protrusion extending through a hole in the cap plate, the second insulating protrusion having a hole, and
wherein the first fixing portion extends through the hole of the second insulating protrusion.

8. The rechargeable battery of claim 1, wherein the first terminal further comprises a first connecting terminal electrically connected to the first electrode, the first connecting terminal comprising a first terminal column protruding away from the electrode assembly, and
wherein the first short-circuit protrusion protrudes from the first connecting terminal toward the electrode assembly.

9. The rechargeable battery of claim 1, further comprising a first support plate between the cap plate and the electrode assembly.

10. The rechargeable battery of claim 9, wherein the first fixing portion is riveted or welded to the first support plate.

11. The rechargeable battery of claim 10, wherein the first fixing portion extends through the first current collecting member and is riveted or welded to the first current collecting member.

12. The rechargeable battery of claim 11, wherein each of the first current collecting member, the first support plate, and the first lower insulating member has a hole, and
wherein the hole of the first current collecting member is aligned with the holes of the first support plate and the first lower insulating member.

13. The rechargeable battery of claim 1, wherein the first terminal further comprises a second fixing portion protruding through the cap plate, the second fixing portion being spaced apart from the first fixing portion, and the first short-circuit member being located between the first fixing portion and the second fixing portion.

14. The rechargeable battery of claim 1, further comprising:
a second terminal electrically connected to the second electrode; and
a second lower insulating member between the second electrode and the cap plate,
wherein the second terminal comprises a second fixing portion electrically connected to the second electrode.

15. The rechargeable battery of claim 14, further comprising:
a second short-circuit member configured to be deformed to electrically connect the cap plate to the second electrode; and
a second upper insulating member between the second terminal and the cap plate,
wherein the second terminal further comprises a second short-circuit protrusion protruding through the cap plate.

16. The rechargeable battery of claim 15, wherein the second terminal further comprises a second connecting terminal electrically connected to the second electrode, the second connecting terminal comprising a second terminal column protruding away from the electrode assembly, and
wherein the second short-circuit protrusion protrudes from the second connecting terminal toward the electrode assembly.

17. The rechargeable battery of claim 1, wherein the terminal connecting portion of the first current collecting member has an opening, and
wherein the first short-circuit member is in fluid communication with the inside of the case through the opening in the terminal connecting portion of the first current collecting member.

* * * * *